United States Patent [19]

Bolen

[11] 4,290,380

[45] Sep. 22, 1981

[54] FOOT CONTROLLABLE BOAT ANCHOR ROPE LOCKING DEVICE

[76] Inventor: Laurance R. Bolen, 3205 S. Davidson, Albany, Oreg. 97321

[21] Appl. No.: 97,053

[22] Filed: Nov. 23, 1979

[51] Int. Cl.³ .............................................. B63B 21/22
[52] U.S. Cl. ............................... 114/210; 24/134 KA; 254/391
[58] Field of Search ........................ 114/210, 199, 218; 254/391; 188/65.1; 24/132 R, 132 AA, 134 R, 134 KA, 134 KB

[56] References Cited

U.S. PATENT DOCUMENTS

| | | | |
|---|---|---|---|
| 637,820 | 11/1899 | Osborne | 254/391 |
| 979,691 | 12/1910 | Owen | 254/391 |
| 1,710,697 | 4/1929 | Gilbert | 114/199 |
| 1,956,903 | 5/1934 | Kline | 114/199 |
| 2,939,550 | 6/1960 | Puttre | 188/65.1 |
| 3,046,929 | 7/1962 | Piver | 114/218 |
| 3,186,372 | 6/1965 | Cleveland | 114/199 |
| 3,626,888 | 12/1971 | Cameron | 114/210 |
| 3,843,999 | 10/1974 | Kramoski | 24/134 KA |

FOREIGN PATENT DOCUMENTS 558797 6/1942 United Kingdom ................ 254/391

Primary Examiner—Robert J. Spar
Assistant Examiner—Kenneth Noland
Attorney, Agent, or Firm—Klarquist, Sparkman, Campbell, Leigh, Whinston and Dellett

[57] ABSTRACT

A boat anchor rope locking device includes a compact housing through which an anchor rope is threaded. A lever pivoted to this housing has a snubbing end portion which wedges the anchor rope between it and the housing and prevents the rope from playing out when the lever is pivoted in one direction. An actuating end portion of the lever projects above the housing where it is engaged by a foot pedal. When the foot pedal is depressed, the lever pivots in the other direction and releases the snubbing end portion from the rope. The lever is spring biased to return the snubbing end portion into locking engagement with the rope when pressure on the foot pedal is relieved. Also, the snubbing end portion automatically pivots in the other direction when the anchor rope is pulled in to release the rope and permit raising of the anchor as desired.

16 Claims, 4 Drawing Figures

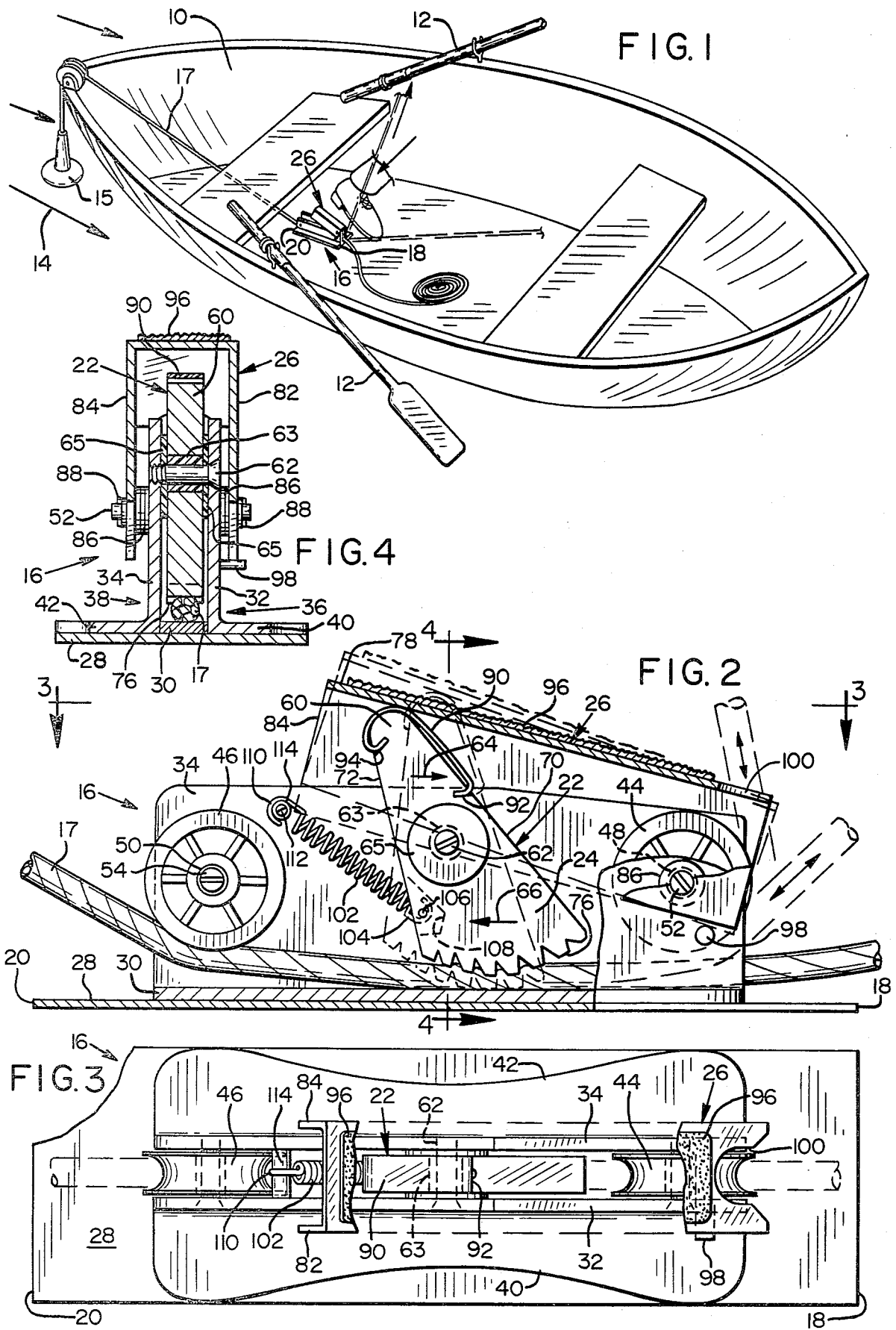

FOOT CONTROLLABLE BOAT ANCHOR ROPE LOCKING DEVICE

BACKGROUND OF THE INVENTION

1. Field of the Invention

The present invention relates to boat anchor rope locking devices.

2. Description of the Prior Art

There are a number of known devices for locking and releasing a boat anchor rope.

However, as typified by U.S. Pat. Nos. 1,956,903 of Kline and 3,186,372 of Cleveland, such devices commonly require an individual to pull on the anchor rope to release them. For this reason, a boat operator is handicapped when dropping anchor as one hand is required for this task thereby leaving only one free hand for other activities.

This proves particularly disadvantageous in the case of row boats used for travel on rivers and streams. In these applications, the boat operator typically must keep both hands on the oars and row to maintain the boat in a desired position as an anchor rope is lowered. As a result, unless the operator has a companion on the boat who can lower the anchor, it is extremely difficult for the operator to anchor the boat in a desired spot. That is, unless the operator can keep both hands on the oars, the boat typically drifts uncontrolled while the anchor rope is lowered. As a result, it is difficult to precisely anchor the boat and keep the boat from drifting on rocks and other obstructions as the anchor is lowered.

Other known boat anchor rope locking mechanisms are disclosed in U.S. Pat. Nos. 3,843,999 of Kramoski, 3,626,888 of Cameron, and 1,710,697 of Gilbert. These devices are also designed for operation by pulling on the anchor rope, and therefore suffer from the disadvantages mentioned above. In addition, they are mounted on the bow of a boat where they are difficult to reach. Thus, if the anchor rope fouls in them, the person operating the boat may have to release the oars and crawl to the bow of the boat to free the rope.

Therefore, a need exists for a compact, easily accessible boat anchor rope locking mechanism which may be actuated without the use of a person's hands.

SUMMARY

It is a primary object of the present invention to provide a foot controllable boat anchor rope locking apparatus.

It is another object of the invention to provide a boat anchor locking apparatus adapted for mounting below the level of seats in a boat.

It is another object of the invention to provide a compact boat anchor rope locking mechanism which minimizes projecting levers and other mechanisms which tend to foul the anchor rope and pose a risk of tripping passengers in the boat.

Still another object of the invention is to provide a durable boat anchor rope locking mechanism which is easy to maintain and use.

Still another object of the present invention is to provide a boat anchor rope locking mechanism which selectively releases the anchor rope upon actuation while at the same time permits the anchor rope to be pulled in as desired.

The foregoing and other objects, features and advantages of the present invention will become more apparent from the following detailed description, which proceeds with reference to the accompanying drawings.

BRIEF DESCRIPTION OF THE DRAWINGS

In the drawings:

FIG. 1 is a perspective view of a riverboat in which a boat anchor rope locking apparatus in accordance with the invention has been installed;

FIG. 2 is a side elevation view of the boat anchor rope locking apparatus of FIG. 1, with a portion thereof removed for clairty;

FIG. 3 is a top plan view of a boat anchor rope locking apparatus in accordance with FIG. 1; and FIG. 4 is a cross-sectional view of a boat anchor rope locking apparatus in accordance with the invention, taken along lines 4—4 of FIG. 2.

DETAILED DESCRIPTION OF PREFERRED EMBODIMENT

The anchor rope locking apparatus of the present invention is designed for foot actuation and prevents playing out of an anchor until the apparatus is actuated, while, at the same time, it continuously permits hauling in of the anchor as desired.

A typical riverboat 10, such as shown in FIG. 1, is non-motorized and instead is powered by oars 12. In heavy current and rapids, represented by arrows 14, the boat operator typically must continuously row to hold the boat in position, for example for fishing. It is often desirable to let out anchor rope 17 to lower an anchor 15 and anchor the boat in a fixed position while the passengers in the boat fish. However, during anchoring of the boat, the operator frequently must row to prevent current 14 from carrying the boat out of position. Therefore, with a foot controllable anchor rope locking apparatus of the present invention, the boat operator can continue to row while anchoring the boat. Consequently, more precise anchoring of the boat in fast current can be achieved.

In general, the preferred embodiment of the invention includes a housing 16 adapted for mounting below the level of seats in a boat so that the apparatus is easily accessible for foot control. In particular, the housing has an inboard end 18 and an outboard end 20, nearest the anchor, and defines a passageway through which the outboard end of anchor rope 17 can be threaded and connected to anchor 15. A lever means 22 is pivoted to the housing with a snubbing end portion 24 (FIG. 2) positioned in the passageway. The snubbing end portion is sized so that pivoting lever 22 in a first direction causes the snubbing end portion to close the passageway a sufficient amount to prevent the rope from playing outboard through the housing. In addition, pivoting of lever 22 in a second direction causes the snubbing end portion to open the passageway and permit playing out of the rope. A foot pedal means 26 is provided for pivoting the lever upon application of foot pressure by a person seated in the boat to release the rope and lower the anchor. In addition, at any desirable time, anchor rope 17 can be pulled inboard through housing 16 to raise the anchor.

Although not to be construed as a limitation, for convenience the preferred embodiment will be described below with reference to a horizontal reference plane along the bottom of the boat. More specifically, housing 16 includes a rectangular, planer, platelike horizontal base 28 having a rectangular elongated spacing strip 30 mounted to its upper surface. Base 28 is adapted for mounting housing 16, and hence the apparatus, in any suitable manner to boat 10. For example, base 28 may be connected to studs projecting upwardly from the bottom of a fiber glass boat which have been imbedded in the fiber glass during manufacture of the boat. Similarly, base 28 can be mounted to the ribs of a wooden boat or to a suitable bracket connected to the boat floorboard.

Housing 16 also includes respective first and second parallel spaced apart vertical walls 32, 34 which project upwardly from the upper surface of the base. In the illustrated form, walls 32, 34 comprise upright flanges of respective angle members 36, 38 which also have horizontal base flange portions 40, 42. Flanges 40, 42 are mounted to base plate 28 with the junction of the respective wall and base flanges abutting the side edges of spacing strip 30. Thus, the inner surfaces of walls 32, 34 together with the upper surface of spacing strip 30 define a rope guiding channel through which anchor rope 17 is threaded.

In addition, the upper surface of spacing strip 30 is smooth to facilitate playing out of the rope and reduce wear on the rope when lever 22 is released from the rope. In addition, walls 32, 34 are of progressively decreasing height moving in an inboard direction from a midportion of the housing to thereby provide clearance for foot pedal 26 as explained below. Housing 16 is preferably constructed of a durable, rigid, light weight material such as aluminum. In addition, the housing is compact and in one form is approximately seven and three-quarter inches in overall length.

The apparatus also includes a first pulley 44 positioned between walls 32, 34 at the inboard end of housing 16 and a second pulley 46 positioned between the walls at an outboard end of the housing. Each pulley is preferably constructed of a light weight, rigid, corrosion-resistant material such as of a plastic. Each pulley 44, 46 is mounted on a respective bushing 48, 50 which in turn is rotatably supported by a respective horizontal pivot pin 52, 54. Wall 34 is tapped to receive pins 54 and the head of this pin is countersunk into wall 32. Pin 52 is also removable and extends outwardly through each wall 32, 34 for supporting foot pedal 26 as explained below. Thus, the pins, and hence the pulleys, can easily be removed for replacement in the event they are damaged. Pulleys 44, 46 are mounted to provide a space between the lower portion of each pulley and the upper surface of strip 30. Typically, this space is sized to accommodate three-eighth inch to half-inch anchor rope. Consequently, with this construction, walls 32, 34, pulleys 44, 46 and strip 30 define a rope guiding passageway for the anchor rope. More specifically, the anchor rope 17 is threaded between walls 32, 34 from the inboard end of the housing, between pulley 44 and strip 30, along the upper surface of strip 30, between pulley 46 and the strip and out the outboard end of the housing to anchor 15.

In the illustrated embodiment, lever 22 is mounted to the housing at a position between pulleys 44, 46. As previously mentioned, lever 22 includes a lower snubbing end portion 24 positioned between walls 32, 34. The lever also includes an upper actuating end portion 16 which, in the preferred embodiment projects upwardly above the upper edges of the respective walls 32, 34.

Lever 22 is pivotally mounted on a bushing 63 supported by a horizontal pivot pin 62 for pivoting about a first horizontal pivot axis which passes through a midportion of the lever. Wall 34 is tapped to receive pin 62 and the head of this pin is countersunk into wall 32 as shown in FIG. 4. Thus, lever 22 can easily be removed to permit its repair or replacement if necessary. Also, washers 65 space lever 22 from the inner surface of walls 32, 34.

Snubbing end portion 24 is sized such that pivoting of the actuating end portion 60 inboard, as shown by arrow 64, pivots the snubbing end portion outboard, as shown by arrow 66, and into engagement with the rope 17. Consequently, snubbing end portion 24 wedges rope 17 between itself and the upper surface of strip 30 and locks the rope to thereby prevent outboard playing of the anchor. Conversely, when the actuating end portion is pivoted in the opposite direction, as by pressing downwardly on foot pedal 26 or by pulling inboard on rope 17, the snubbing end portion moves in the opposite direction and releases the rope so that it is free to play out or be pulled in.

As can be seen in FIG. 2, lever 22 is generally triangularly shaped and includes a first side edge 70 and a second side edge 72 which join together at their upper ends to form the actuating end portion 60. Side edge 70 is longer than side edge 72. The third side edge 76 is the shortest of the three and comprises a snubbing surface which is positioned adjacent to base 28. Side edge 76 is curved and provided with plural rope gripping teeth to facilitate engagement of the snubbing end portion to the rope. Also, side edge 70 is positioned adjacent the inboard end of the housing and is positioned so that the free end of foot pedal 26 engages an upper portion of this side edge as explained below, to pivot lever 22. Also, the upper portion of side edge 70 is inclined toward the outboard end of the housing 16 relative to the lower portion of this side edge so that application of the foot pedal applies a force to the lever through a line above pivot pin 62.

Like housing 16, lever 22 is preferably of a light weight rigid material such as aluminum.

In the preferred embodiment, foot pedal 26 is pivoted at its inboard end by the portions of pin 52 projecting outwardly from walls 32, 34, FIG. 4, to an inboard end portion of housing 16 for pivoting about a second horizontal axis. A free end portion of the foot pedal projects in an outboard direction and is positioned to engage lever 22 when it is depressed. That is, the free end of foot pedal 26 overhangs actuating end portion 60 of the lever so that, by pressing downwardly on the foot pedal, the actuating end portion is pivoted in an outboard direction to in turn release the snubbing end portion 24 from rope 17.

The free end portion 78 of foot pedal 26 terminates short of the outboard end of housing 16 and is positioned to extend generally along the upper edges of walls 32, 34. Consequently, foot pedal 26 does not project substantially away from the housing where it could foul the anchor rope and has a low profile so as to reduce the chance of passengers in a boat tripping over it.

Foot pedal 26 preferably comprises an inverted channel member with a pair of vertical side legs 82, 84 that define a slot between them of sufficient width for insertion of the walls 32, 34 of housing 16. Pin 52 secures the respective side legs 82, 84 to the first and second walls 32, 34 with the inner surface of side leg 82 being adjacent to the outer surface of wall 32 and the inner surface of side leg 84 being adjacent to the outer surface of wall 34. Washers 86 space side walls 32, 34 from the respective legs 82, 84. In addition, pin 52 is conveniently held in place by a cotter pin and washer assembly 88. Therefore, a corresponding portion of walls 32, 34 are positioned within the slot defined by legs 82, 84 in all operating positions of foot pedal 26. As a result, vertical legs 82, 84 limit the lateral shifting movement of the foot pedal and prevent misalignment of the foot pedal during use.

Also, a friction reducing means is disposed between the actuating end portion 60 and free end 78 of the foot pedal to facilitate relative movement between these members. Such a friction reducing means may comprise a teflon strip 90 which wraps the upper end of actuating end portion 60. One end of strip 90 is inserted and held within a slot 92 in side edge 70 while the other end of strip 90 is held within a slot 94 in side edge 72. Also, an adhesively backed antiskid strip 96 may be secured to the upper surface of foot pedal 26 to minimize the chance of the operator's foot slipping off the foot pedal during use. In addition, a stop 98 projects outwardly from wall 32 and limits the upward pivoting of the free end 78 of foot pedal 26. In addition, as best seen in FIG. 3, the inboard end of the upper surface of foot pedal 26 is notched at 100 to provide clearance for the rope when it is lifted upwardly and pulled in.

Finally, a biasing means is provided for pivoting lever 22 into locking engagement with rope 17 upon removal of foot pressure on the foot pedal. In particular, one form of biasing means comprises a coil spring 102 connected at a lower end 104 to a pin 106 positioned within a recess 108 defined in the surface of side edge 72. The opposite end 110 of spring 102 is held by a pin 112 extending between walls 32, 34. Wall 34 is tapped for receiving pin 112 while the head of this pin is countersunk into wall 32. In addition, a sleeve 114 of plastic or other wear reducing material surrounds pin 112 to reduce the wear on spring end 110 during operation of the device. Thus, spring 102 applies a tensile force to lever 22 acting below pin assembly 62 to automatically return snubbing end portion 24 into engagement with rope 17 whenever pressure on foot pedal 26 is released.

In operation, rope 17 is fed through housing 16 and connected to an anchor 15 typically suspended over one end of the boat. In addition, with the operator's foot removed from foot pedal 26, the snubbing end portion 24 of lever 22 engages rope 17 and prevents the anchor from playing out. To release the anchor rope and hence lower the anchor, the operator applies foot pressure to pedal 26 causing snubbing end portion 24 to pivot free of the rope. As a result, rope 17 plays outwardly through the housing. Pulleys 44, 46 guide the movement of the rope through the housing. When the anchor rope has played out sufficiently to place the boat in a desired position, the operator lifts his foot off the foot pedal. Spring 102 aided by gravity and friction of the outboard traveling rope against the snubbing end portion, returns the snubbing end portion into engagement with rope 17 and prevents it from playing out. If the boat is not in the exact position desired, additional rope can be let out as in the same manner by depressing foot pedal 26. To raise the anchor, the operator merely grasps the rope and pulls it in. This automatically pivots the snubbing end portion 24 out of engagement with the rope.

Having illustrated and described the principles of my invention with reference to one preferred embodiment, it should be apparent to those persons skilled in the art that this invention can be modified in arrangement and detail without departing from such principles.

What is claimed is:

1. A foot controllable boat anchor rope locking apparatus comprising:
    a housing which defines a passageway through which the anchor rope may be threaded with the outboard end of the rope being connected to the anchor, said housing being adapted for mounting to the boat below the level of seats in the boat to thereby make the housing readily accessible to the foot of a person seated in the boat;
    lever means pivoted to said housing for pivoting about a lever means pivot axis, said lever means having a snubbing end portion positioned within said passageway, and an actuating end portion said lever means being positioned such that pivoting said lever means in a first direction about said lever means pivot axis causes said snubbing end portion to close said passageway sufficiently to prevent the rope from playing outboard through the housing, and such that pivoting said lever means in a second direction about said lever means pivot axis causes said snubbing end portion to open said passageway sufficiently to permit outboard playing of the rope through the housing;
    foot pedal means pivoted at one end portion to said housing and having its opposite or free end portion generally overhanging the passageway defined by said housing and also said lever means, said foot pedal means having an actuating undersurface positioned for engaging said actuating end portion upon application of foot pressure to said pedal means by a person seated in the boat and for pivoting said lever means in said second direction in response to the foot pressure.

2. An apparatus according to claim 1 including biasing means positioned within said housing for pivoting said lever means in said first direction upon removal of the foot pressure to cause said snubbing end portion to close said passageway to prevent outboard playing of the rope.

3. An apparatus according to claim 1 in which said foot pedal means is pivoted at an inboard end portion of the housing and has its free end portion projecting toward the outboard end of said housing.

4. An apparatus according to claim 3 in which said foot pedal means partially surrounds a portion of said housing and in which the free end of said foot pedal means terminates generally short of the outboard end of the housing to minimize outward projection of the foot pedal means from the housing to thereby reduce possibility of passengers in the boat tripping over the foot pedal means.

5. A foot controllable boat anchor rope locking apparatus comprising:
    a base;
    first and second parallel spaced apart walls projecting outwardly from one surface of said base such that said walls and one surface of the base define a rope guiding channel through which the anchor rope may be threaded with the outboard end of the rope being connected to the anchor;
    a lever having a snubbing end portion and an actuating end portion, said lever being pivoted at a midportion to said walls for pivoting about a first axis generally normal to the walls, with said snubbing end portion and said actuating end portion being on opposite sides of said first axis, said lever being sized and positioned such that pivoting said lever in one direction about said first axis pivots said snubbing end portion in an outboard direction and into engagement with the rope so as to wedge the rope between said one surface of the base and said snubbing end portion to thereby prevent outboard playing of the rope, and such that application of pressure to said actuating end portion pivots said lever in the other direction about said first axis and pivots said snubbing end portion in an inboard direction and out of engagement with the rope so as to permit outboard playing of the rope; and foot pedal means for pivoting said lever in said other direction, said foot pedal means being pivoted at one end portion to said walls for pivoting about a second pivot axis spaced from and generally parallel to said first pivot axis, the free end portion of said foot pedal means being positioned to generally overhang said first and second walls and also said actuating end portion such that an undersurface of said free end portion engages said actuating end portion and pivots said lever in said other direction upon application of pressure to and pivoting of said foot pedal means in one direction about said second axis.

6. An apparatus according to claim 5 including a biasing spring means disposed between said first and second walls and connected at one end portion to said housing and at its other end portion to said lever for pivoting said lever in said one direction upon relief of pressure from said foot pedal means to prevent outboard playing of the rope when such pressure is relieved.

7. A foot controllable boat anchor rope locking apparatus comprising:

a base;

first and second parallel spaced apart walls projecting outwardly from one surface of said base such that said walls and one surface of the base define a rope guiding channel through which the anchor rope may be threaded with the outboard end of the rope being connected to the anchor;

a lever having a snubbing end portion and an actuating end portion, said lever being pivoted at a midportion to said walls for pivoting about a first axis generally normal to the walls, said lever being sized and positioned such that pivoting said lever in one direction about said first axis pivots said snubbing end portion in an outboard direction and into engagement with the rope so as to wedge the rope between said one surface of the base and said snubbing end portion to thereby prevent outboard playing of the rope, and such that pivoting said lever in the other direction about said first axis pivots said snubbing end portion in an inboard direction and out of engagement with the rope so as to permit outboard playing of the rope;

foot pedal means for pivoting said lever in said other direction, said foot pedal means being pivoted at one end portion to said walls for pivoting about a second pivot axis spaced from and generally parallel to said first pivot axis, the free end portion of said foot pedal means being positioned to said actuating end portion such that said free end portion engages said actuating end portion and pivots said lever in said other direction upon application of pressure to said foot pedal means to pivot said foot pedal means in one direction about said second axis;

said lever means being generally triangular in shape having first and second side edges joining together to form said actuating end portion, said first side edge being longer than said second side edge, and having a third side edge shorter than said first and second side edges and comprising said snubbing end portion, said lever being pivoted to said walls with the third side edge adjacent the base, and the first side edge adjacent the inboard end of the housing and positioned such that said foot pedal means engages said first side edge upon application of foot pressure thereto.

8. An apparatus according to claim 7 in which said third side edge is curved and provided with plural rope gripping teeth to facilitate engagement of the rope to prevent it from playing outboard.

9. An apparatus according to claim 8 in which said one surface of the base is smooth to facilitate playing out of the rope when said snubbing end portion is disengaged from the rope.

10. A foot controllable boat anchor rope locking apparatus comprising:

a housing having an inboard end and an outboard end with the outboard end positioned nearest to the boat anchor, said housing including a generally horizontal base and first and second parallel spaced apart vertical walls projecting outwardly from an upper surface of the base;

first and second pulleys each mounted between said first and second walls and spaced from said base, said first pulley being positioned adjacent the inboard end of said housing and said second pulley being positioned adjacent the outboard end of the housing;

said first and second walls, said first and second pulleys and said base together defining a rope guiding passageway through which the anchor rope may be threaded from the inboard end of said housing, between the first pulley and said base, along the upper surface of the base, between said second pulley and the base, out the outboard end of the housing and to the anchor;

a lever positioned generally between said first and second pulleys and having a lower snubbing end portion positioned between said first and second walls and an upper actuating end portion projecting above said walls, said lever being pivoted to said housing for pivoting about a first horizontal axis which passes through a midportion of said lever, said snubbing end portion being sized such that pivoting said actuating end portion in an inboard direction about said first axis pivots said snubbing end portion in an outboard direction and into engagement with the rope so as to wedge the rope between said snubbing end portion and the upper surface of the base to thereby prevent outboard playing of the rope, and such that pivoting said actuating end portion in an outboard direction about said first pivot axis pivots said snubbing end portion in an inboard direction and out of engagement with the rope to thereby permit outboard playing of the rope;

a foot pedal pivoted at one end portion to an inboard end portion of said housing for pivoting about a second horizontal axis, said foot pedal having its free end portion overhanging the actuating end portion of said lever such that pressing the foot pedal downwardly about said second axis brings its free end portion into engagement with said actuating end portion of the lever and pivots said actuating end portion in an outboard direction to thereby disengage the snubbing end portion from the rope; and biasing means for pivoting the snubbing end portion into engagement with the rope upon release of said foot pedal to thereby prevent outboard playing of the rope when the foot pedal is released.

11. An apparatus according to claim 10 in which said lever means is generally triangular in shape having first and second side edges joining together to form said actuating end portion, said lever being mounted so that the upper portion of said first side edge is inclined toward the outboard end of the housing relative to its lower portion, the free end portion of the lever engaging the upper portion of said first side edge upon application of pressure to said foot pedal to pivot said actuating end portion in an outboard direction and release the rope.

12. An apparatus according to claim 11 including friction reducing means disposed between said actuating end portion and said free end portion of the foot pedal to facilitate movement of the foot pedal relative to the actuating end portion upon application of pressure to the foot pedal.

13. An apparatus according to claim 10 including a stop means mounted to said housing for limiting upward pivoting of said foot pedal.

14. A foot controllable boat anchor rope locking apparatus comprising:

a housing having an inboard end and an outboard end with the outboard end positioned nearest to the boat anchor, said housing including a generally horizontal base and first and second parallel spaced apart vertical walls projecting outwardly from an upper surface of the base;

first and second pulleys each mounted between said first and second walls and spaced from said base, said first pulley being positioned adjacent the inboard end of said housing and said second pulley being positioned adjacent the outboard end of the housing;

said first and second walls, said first and second pulleys and said base together defining a rope guiding passageway through which the anchor rope may be threaded from the inboard end of said housing, between the first pulley and said base, along the upper surface of the base, between said second pulley and the base, out the outboard end of the housing and to the anchor;

a lever positioned generally between said first and second pulleys and having a lower snubbing end portion positioned between said first and second walls and an upper actuating end, said lever being pivoted to said housing for pivoting about a first horizontal axis which passes through a midportion of said lever, said snubbing end portion being sized such that pivoting said actuating end portion in an inboard direction about said first axis pivots said snubbing end portion in an outboard direction and into engagement with the rope so as to wedge the rope between said snubbing end portion and the upper surface of the base to thereby prevent outboard playing of the rope, and such that pivoting said actuating end portion in an outboard direction about said first pivot axis pivots said snubbing end portion in an inboard direction and out of engagement with the rope to thereby permit outboard playing of the rope;

a foot pedal pivoted at one end portion to an inboard end portion of said housing for pivoting about a second horizontal axis, said foot pedal having an actuating portion of its free end portion overhanging the actuating end portion of said lever such that pressing the foot pedal downwardly about said second axis brings the actuating portion of its free end portion into engagement with said actuating end portion of the lever and pivots said actuating end portion in an outboard direction to thereby disengage the snubbing end portion from the rope; and biasing means for pivoting the snubbing end portion into engagement with the rope upon release of said foot pedal to thereby prevent outboard playing of the rope when the foot pedal is released; and in which said foot pedal comprises and inverted channel member having a pair of vertical side legs defining a slot therebetween of sufficient width for receiving said first and second walls therein, said side legs of said foot pedal being pivoted to said first and second walls such that a corresponding portion of each said first and second walls is positioned within said slot in all operating positions of the foot pedal, so that the side walls defining the slot limit lateral movement of the foot pedal to thereby prevent its misalignment during operation.

15. An apparatus according to claim 14 in which the first and second walls are of progressively decreasing height moving in an inboard direction from a midportion of the housing to provide clearance for the foot pedal.

16. An apparatus according to claim 14 in which the inboard end of the foot pedal is notched so as to provide clearance for lifting of the rope prior to hauling the anchor inboard.

* * * * *